Patented Sept. 23, 1930

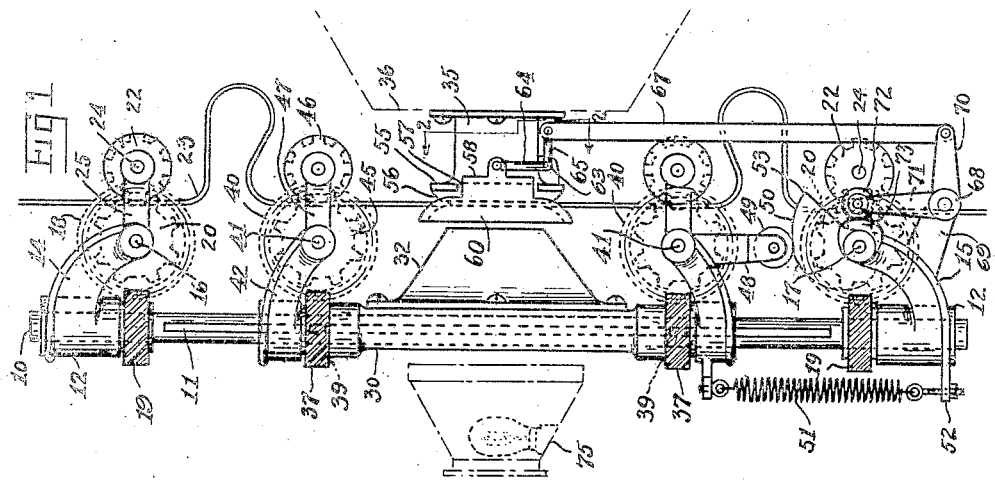

1,776,330

UNITED STATES PATENT OFFICE

PAUL G. SWARS, OF PITTSBURGH, PENNSYLVANIA, ASSIGNOR TO M. LIPMAN, OF NEW YORK, N. Y.

FILM-FEEDING MECHANISM

Application filed June 7, 1924. Serial No. 718,547.

This invention relates to film feed devices for motion picture machines, though it is noted that the invention is not limited to motion picture machines, nor ribbon feeding means, nor in some respects even to feeding means.

One object of the invention is to provide a feeding device of this kind in which breakage and wear of the film are reduced to a minimum.

Another object of the invention is to provide an apparatus or device of this kind having an improved gripping means for holding the film steady during projection or exposure.

Other objects of the invention are to improve generally the simplicity and efficiency of such devices and to provide a device or apparatus of this kind which is durable, economical to manufacture and operate and which will not get out of order.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with an improved feeding mechanism which, briefly stated, includes a reciprocatory carriage carrying continuously uniformly rotating feed-roll sprockets for moving the film parallel to the path of the said carriage, the carriage moving in one direction reverse to the film at the same speed that the film is fed relative to the carriage, whereby the film is held stationary and in the other in the direction of feed of the film, whereby the film is fed an increment. Means are also provided to grip the film on the reverse stroke of the carriage to hold the film stationary for exposure or projection.

In the accompanying drawing, showing by way of example, one of many possible embodiments of the invention, Fig. 1 is a side elevation showing the film feed device; and Fig. 2 is a front elevation, partly in section on the line 2—2 of Fig. 1.

A pair of parallel vertical rotary guiding drive shafts 10 each provided with a long longitudinal key-way 11 are rotatably mounted in bearing blocks 12 at the upper and lower ends of said shafts and suitably mounted on the frame or other fixed parts of the machine. Bearing brackets 14 and 15 on said blocks carry upper and lower feed-roll shafts 16 and 17 each carrying driven gears 18 meshing with drive gears 19 fast on each of said drive shafts. Feed and take-up sprockets 20 are mounted on said feed roll shafts respectively; while retaining rolls 22 cooperate with the sprockets for keeping the film 23 thereon. The retaining rolls are suitably supported, as for instance, by shafts 24 carried in brackets 25 mounted on the brackets 14 and 15.

A vertically reciprocating carriage 30 is provided with vertical bearing slide bores receiving said shafts 10 to permit the carriage to slide up and down, and has mounted thereon a light barrel 32 of more than double film picture height and disposed in alinement with a large light opening 33 provided in the carriage, as shown in Fig. 2.

A lens 35 is fixed on a part of the frame 36 or other support forward of the film in alinement with the middle position of said light barrel. Spiral gears 37 in gear recesses 38 in the upper and lower corners of the carriage are slidable on said guide shafts and are provided with keys 39 engaged in said ways 11 to constrain the spiral gears to rotate with the guide shafts. Gears 40 fixed on carriage feed-roll shafts 41 in projecting brackets 42 on said carriage, respectively engage with said spiral gears 37. Carriage feed-roll sprockets 45 are fixed on said carriage shafts 41, and retaining rolls 46 carried on brackets 47 mounted on the brackets 42 hold the film on the carriage feed-rolls.

A roller bracket 48 depending from the lower part of the carriage carries a roller 49 engageable by a cam 50 fast on the lower feed-roll shaft 17. Said cam is profiled to raise the carriage at the same speed that the film is fed down relative to the carriage by the carriage feed rolls 40, whereby the film remains stationary relative to the lens when the carriage rises. A spring 51 tensioned between a fixed member 52 and the carriage lowers the carriage after the tip 53 of the cam has left the roller, whereby to feed the film one picture distance.

The film passes through a film gate which includes a fixed frame 55 on the side of the film toward the lens and here shown fixed to the lens barrel. This frame is provided with a friction face engaging the film and a pair of long side recesses 57 receiving forwardly projecting lateral guide ears 58 provided on a movable frame 60 at the back of the film and just forward of the light barrel 32. A rock shaft 63 (Fig. 2) mounted on the fixed frame is provided with a pair of active arms 64 pivoted to said ears. A forwardly projecting motive arm 65 (Fig. 1) fast on the rock shaft carries a link 67 depending therefrom. A bell crank 68 pivoted at its elbow part on a bracket 69 carried on the bracket 15 has one arm 70 pivoted to said link and the other 71 provided with a roller 72 engaged by a cam 73 on said take-up roll shaft 17 adapted to press said roller 72 outwardly and cause the movable frame 60 to grip the film and hold it free from vibration for projection or exposure while the film is stationary on the up-stroke of the carriage.

While I show the feed mechanism in connection with a lamp housing 75 of a projector, it is specifically stressed that this invention is not limited to motion picture projectors or cameras, but may be used wherever any material is to be fed or gripped.

I claim:

1. In combination, vertical continuously rotating guiding drive shafts each provided with a key-way; a vertically reciprocating carriage provided with an intra-marginal light opening more than twice the height of the film picture, projecting bearing brackets at the corners of the carriage, and at the sides with upper and lower edge gear recesses and vertical bearing slide bores receiving said shafts to permit the carriage to slide up and down; a barrel of more than double lens picture height fast on said carriage in alinement with said light opening and provided at the free end with a light gate; a lens fixed forward of the barrel; spiral gears in said gear recesses and slidable on said guide shafts and provided with keys engaged in said ways to constrain the spiral gears to rotate continuously with the guide shafts; carriage feed-roll shafts in said projecting brackets; gears fixed on said carriage shafts and respectively engageable with said spiral gears; carriage continuous feed-roll sprockets fixed on said carriage shafts; retaining rolls carried by the carriage for holding the film on the carriage feed-rolls; and means for reciprocating the carriage.

2. In combination, a reciprocatory carriage; continuous feed-roll sprockets mounted on said carriage; means adapted to move the carriage in a direction reverse to the movement of the film at the same speed that the film is fed relative to the carriage, whereby the film is held stationary; means for returning the carriage, thereby to feed the film; a film gate comprising a fixed frame provided with a friction face engaging the film; a movable frame at the back of the film; a rock shaft mounted on the fixed frame and provided with a pair of active arms pivoted to said movable frame; a lever connected to said rock shaft and provided with a roller; and a cam adapted to engage said roller to cause the movable frame to grip the film while the film is stationary.

3. In combination, a vertically reciprocating carriage provided with an intra-marginal light opening; continuous feed-roll sprockets mounted on said carriage; a barrel fast on said carriage in alinement with said light opening; a lens barrel; a fixed frame on the side of the film toward said lens provided with a friction face engaging the film and a pair of long side recesses; a movable frame at the back of the film provided with forwardly projecting lateral guide ears slidable in said recesses; a rock shaft mounted on the fixed frame and provided with a pair of active arms pivoted to said ears; a lever operatively connected to said rock shaft and provided with a roller; and a cam on a take-up roll shaft adapted to press said roller outwardly and cause the fixed frame to grip the film and hold it free from vibration while the film is stationary on the up stroke of the carriage.

4. In combination, parallel continuously rotating guiding shafts each provided with a longitudinal key way; bearing blocks at the upper and lower ends of said shafts and provided with bearing bores receiving said shafts; bearing brackets on said blocks; feed-roll shafts in said brackets; driven gears on said feed-roll shafts; drive gears fast on one of said drive shafts and engaging said driven gears; continuous feed and take-up sprockets on said feed roll shafts respectively; retaining rolls cooperating with the sprockets for keeping the film therein; a vertically reciprocating carriage provided with projecting bearing brackets and upper and lower edge recesses and vertical bores receiving said shafts; spiral gears in said recesses and slidable on said guide shafts and provided with keys engaged in said ways; carriage feed-roll shafts in said projecting brackets; gears fixed on said carriage shafts and respectively engageable with said spiral gears; carriage continuous feed-roll sprockets fixed on said carriage shafts; a roller on the lower part of the carriage; and means for reciprocating the carriage.

5. In combination, a pair of identical continuously rotating guiding shafts; a reciprocatory carriage provided with bores receiving said shafts and arranged symmetrical to said shafts; feed roll shafts on said carriage; means associated with said rotating guiding shafts adapted to continuously drive said carriage feed shafts; feed roll sprockets mounted on said feed roll shafts adapted to feed a film; and means associated with said rotating guiding shafts; adapted to move the carriage in a direction reverse to the film at the same speed that the film is fed relative to the carriage, whereby the film is held stationary.

6. In combination, a symmetrical reciprocatory carriage; continuous feed roll sprockets mounted on said carriage adapted to feed a film; continuously rotating means engaging both sides of the carriage adapted to continuously drive said sprockets; means associated with said rotating means and cooperating with said carriage to move the carriage in a direction reverse to the film at the same speed that the film is fed relative to the carriage by the sprockets, whereby the film is held stationary, and means to grip the film on the movement of the carriage in a direction reverse to the film.

7. In combination, a pair of vertical continuously rotating guiding drive shafts; a carriage provided with recesses and with bores receiving said shafts; gears in said recesses and slidable on and constrained to rotate with said guide shafts; feed roll shafts on said carriage; gears on said feed roll shafts and respectively engageable with said gears on the vertical shafts; continuous feed roll sprockets mounted on said feed roll shafts adapted to feed a film; and identical cams driven by said vertical shafts engaging both sides of the carriage adapted to move the carriage in a direction reverse to the film at the same speed that the film is fed relative to the carriage, whereby the film is held stationary.

8. In combination, a pair of vertical continuously rotating guiding drive shafts; a carriage provided with recesses and with bores receiving said shafts; gears in said recesses and slidable on and constrained to rotate with both of said guide shafts respectively; feed roll shafts on said carriage; gears on both ends of said feed roll shafts and respectively engageable with said gears on both the vertical shafts; continuous feed roll sprockets mounted on said feed roll shafts adapted to feed a film; and means associated with said vertical shafts adapted to move the carriage in a direction reverse to the film at the same speed that the film is fed relative to the carriage, whereby the film is held stationary.

9. In combination continuously rotating main shafts, a carriage movably associated with said shafts; continuous feed sprockets operatively associated with said main shafts adapted to feed a film mounted on said carriage; and reciprocating means operatively associated with said rotating main shafts adapted to move the carriage in a direction reverse to the film at the same speed that the film is fed relative to the carriage by said sprockets, whereby the film is held stationary; and means operatively associated with said main shafts adapted to grip the stationary part of the film during the movement of the carriage in a direction reverse to the film.

10. In combination continuously rotating main shafts, a carriage; continuous feed sprockets operatively associated with said main shafts adapted to feed a film mounted on said carriage; and means operatively associated with said main shafts adapted to move the carriage in a direction reverse to the film at the same speed that the film is fed relative to the carriage by the sprockets, whereby the film is held stationary; means for casting a light image on the film between the sprockets, and means operatively associated with said main shafts adapted to grip the film around the image during said reverse direction.

11. In combination rotating main shafts, a symmetrical carriage; continuous feed sprockets operatively associated with said shafts adapted to feed a film mounted on said carriage; and identical cam means associated with said shafts engaging both sides of the carriage respectively and adapted to move the carriage in a direction reverse to the film at the same speed that the film is fed relative to the carriage by the sprockets, whereby the film is held stationary.

Signed at East Pittsburgh, in the county of Allegheny and State of Pennsylvania, this 6th day of June, A. D. 1924.

PAUL G. SWARS.